United States Patent [19]

Hirakui et al.

[11] Patent Number: 4,820,094
[45] Date of Patent: Apr. 11, 1989

[54] ROPE HOOK ARRANGEMENT FOR VEHICLE

[75] Inventors: Hidemasa Hirakui, Yokohama; Masayoshi Kishima, Atsugi, both of Japan

[73] Assignee: Nissan Motor Co., Ltd., Japan

[21] Appl. No.: 681,659

[22] Filed: Dec. 14, 1984

[30] Foreign Application Priority Data

Dec. 20, 1983 [JP] Japan .................. 58-238869

[51] Int. Cl.$^4$ ............................. B60P 7/08
[52] U.S. Cl. .................... 410/107; 292/DIG. 4; 403/322; 410/110; 410/111
[58] Field of Search ............. 410/10, 11, 23, 52, 410/55, 85, 96, 101, 102, 106, 107, 108, 110, 111, 116; 403/322, 325, 330; 248/509; 200/153 J, 325, 328; 292/127, DIG. 4, DIG. 37

[56] References Cited

U.S. PATENT DOCUMENTS

| | | | |
|---|---|---|---|
| 1,338,052 | 4/1920 | Voight | 292/DIG. 4 X |
| 2,729,417 | 1/1956 | Maynard | 410/111 |
| 2,729,418 | 1/1956 | Maynard | 410/102 |
| 3,102,708 | 9/1963 | Crain | 410/107 |
| 3,917,213 | 11/1975 | Poehlmann | 410/111 X |
| 4,227,726 | 10/1980 | Sorimachi | 292/DIG. 4 X |

OTHER PUBLICATIONS

Japanese Utility Model Provisional Publication 53-84820, published 7-1978.
Japanese Utility Model Provisional Publication, 51-47111, published 4-1978.

Primary Examiner—Robert B. Reeves
Assistant Examiner—Frank Williams
Attorney, Agent, or Firm—Leydig, Voit & Mayer

[57] ABSTRACT

A rope hook arrangement for a vehicle has a case fixed to the vehicle body and a movable member slidable rectilinearly in the case. A rope hook fixed to one end of the movable member can be projected from the vehicle body and retracted. A spring is disposed between the case and movable member so that the movable member is always urged outwardly. A latch lever is swingably mounted on the movable member, and first and second pins are fixed to the case. The first pin engages with the latch lever and holds the movable member in a middle position in which the rope hook is snugly retracted. If the movable member is pushed down to a depressed position by hand, and unhanded at that position, the first pin pushes the latch lever to a release position, so that the movable member is lifted up by the spring to a projected position in which the rope hook is projected from the vehicle body. When the movable member is pushed down from the projected position to the middle position, the second pin pushes the latch lever to a lock position, so that the rope hook can be easily retracted.

8 Claims, 3 Drawing Sheets

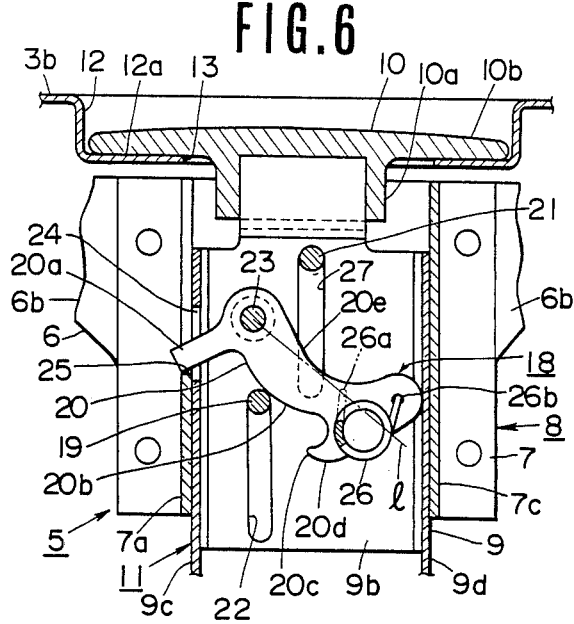
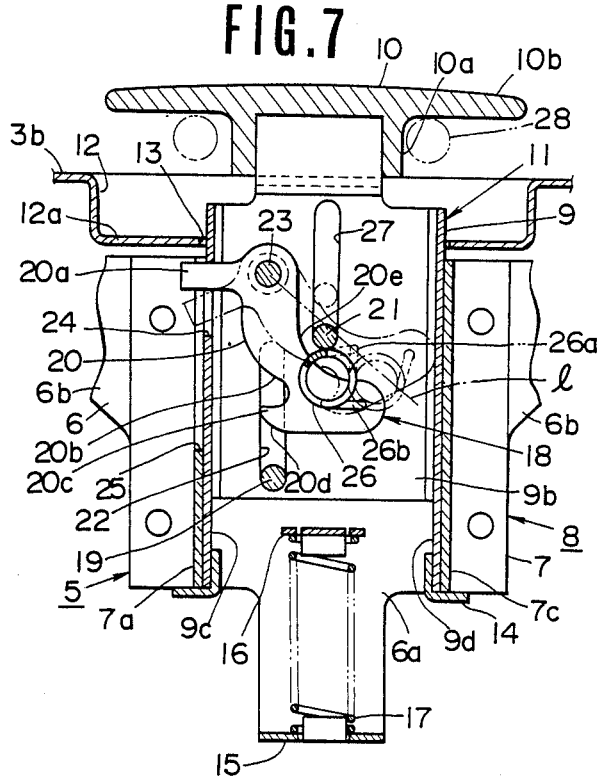

ROPE HOOK ARRANGEMENT FOR VEHICLE

BACKGROUND OF THE INVENTION

The present invention relates to a rope hook for catching, dragging or fastening ropes. Rope hooks are widely used in trucks and other vehicles for tying goods and equipment.

Rope hooks of one conventional type (as disclosed in Japanese Utility Model application provisional publication No. 53-84820) are fixed to tops of vertical side boards of a load carrying platform of a truck, so that the rope hooks always project upwardly from the tops of the sideboards. The rope hooks of this type are undesirable in that they tends to catch clothes of persons working or walking nearby, that they tends to strike against pedestrians or other objects when the vehicle is moving, and that they injure the appearance of the vehicle.

Rope hooks of another conventional type (as disclosed in Japanese Utility Model application provisional publication No. 51-47111) are fixed to inward faces of side boards of a vehicle. The rope hooks of this type are still unsatisfactory in that they are obstructive to loads, and decrease the load capacity of the vehicle, that they tend to injure goods of the vehicle by striking against them, and that it is difficult to pass a rope over the rope hooks of this type especially when the vehicle is fully loaded.

SUMMARY OF THE INVENTION

It is an object of the present invention to provide a rope hook arrangement whose rope hook can be projected and retracted by very simple operation and which is simple in construction and easy to manufacture.

According to the present invention, a rope hook arrangement for a vehicle, comprises housing means, a movable member, biasing means and latching means. The housing means is adapted to be fixed to a vehicle body. The movable member is mounted on the housing means in such a manner that the movable member is movable relative to the housing means rectilinearly in outward and inward directions between a projected and depressed positions. The movable member has a rope hook having an outwardly facing outward face. When the movable member is in the projected position, the rope hook is projected outwardly from a predetermined reference surface, such as a contour surface of the vehicle body, which is stationary relative to the housing means. When the movable member is in the depressed position, the rope hook is depressed inwardly below the predetermined reference surface. The biasing means is disposed between the housing means and movable member for urging the movable member outwardly to the projected position. The latching means selectively allows the movable member to move to the projected position, and maintains the movable member in a middle position lying between the projected and depressed positions. When the movable member is in the middle position, the outward face of the rope hook lies on the predetermined reference surface. The latching means comprises fixed means and swingable means one of which is mounted on the housing means and the other of which is mounted on the movable member. The fixed means is fixedly mounted on the housing means or the movable member. The swingable means is mounted on the housing means or the movable member in such a manner that the swingable means is swingable between a lock position and a release position. The fixed means comprising first actuating means, such as a striker pin, which engages with the swingable means and thereby prevents the movable member from moving outwardly from the middle portion to the projected position when the movable member is in the middle position while at the same time the swingable means is in the lock position, and which forces the swingable means to swing from the lock position toward the release position by pushing the swingable means when the movable member moves inwardly from the middle position to the depressed position. The fixed means further comprises second actuating means which forces the swingable means to swing from the release position toward the lock position when the movable member moves outwardly from the middle position to the projected position.

BRIEF DESCRIPTION OF THE DRAWINGS

FIG. 6 is a view similar to FIG. 5, but showing a state in which the movable member is in a depressed position; and FIG. 7 is a view similar to FIG. 5 but showing a state in which the movable member is in a projected position.

DETAILED DESCRIPTION OF THE INVENTION

One embodiment of the present invention is shown in FIGS. 1 to 7.

Figure 1:
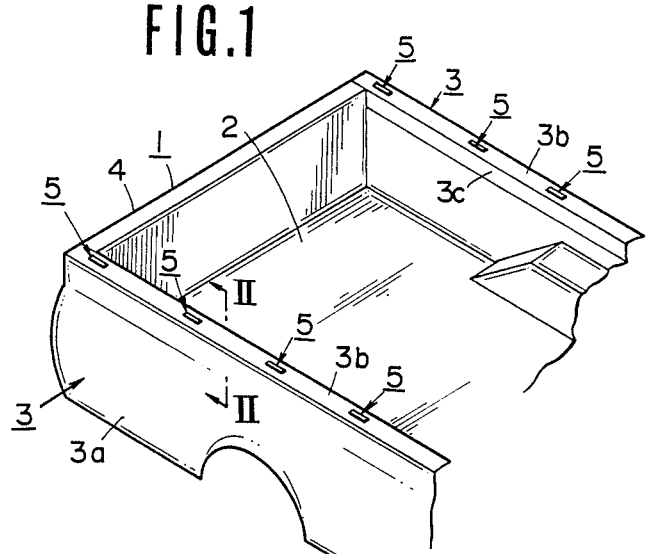
FIG. 1 is a schematic perspective view of a rear body of a truck equipped with the rope hook arrangements of the present invention.
Figure 2:
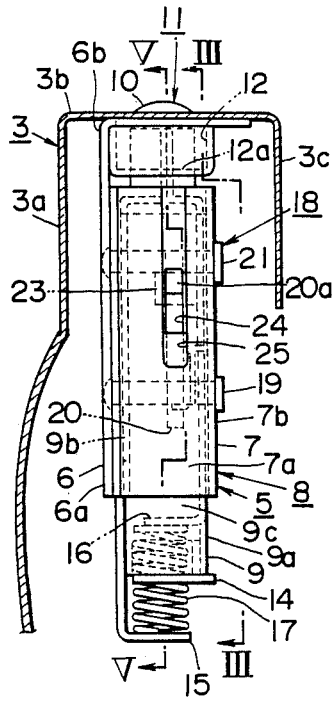
FIG. 2 is an enlarged vertical sectional view taken across a line II—II of FIG. 1.

As shown in FIG. 1, a rear body 1 of a truck has a floor board 2, right and left upright fixed side boards 3 and a hinged tail board 4.

Each of the side boards 3 has an outer panel portion 3a, a top panel portion 3b, and an inner panel portion 3c. The outer and inner portions 3a and 3c of each side board 3 are generally vertical. The top portion 3b of each side board 3 extends generally horizontally between the outer and inner portions 3a and 3c to form a top surface of the side board.

A plurality of rope hook arrangements 5 are disposed in each side board 3 under the top portion 3b between the outer and inner portions 3a and 3c. In each side board 3, the rope hook arrangements 5 are arranged at appropriate intervals in a longitudinal line of the side board 3 in parallel to a longitudinal line of the truck.

Figure 3:
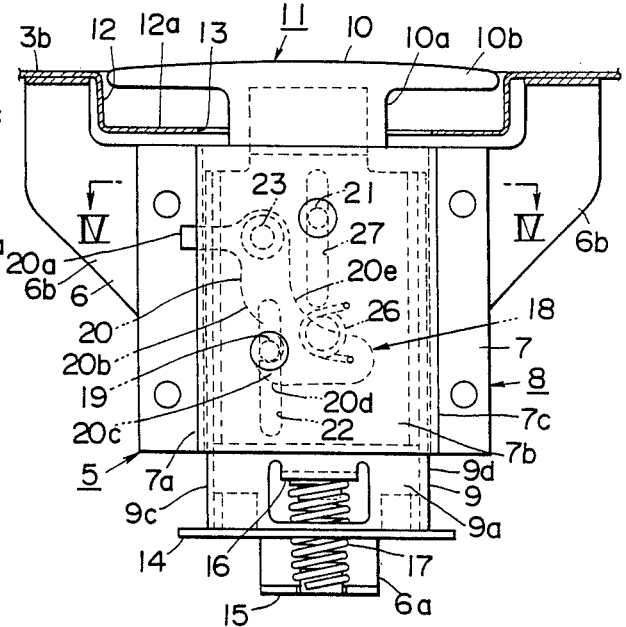
FIG. 3 is a vertical sectional view taken across a line III—III of FIG. 2.
Figure 4:
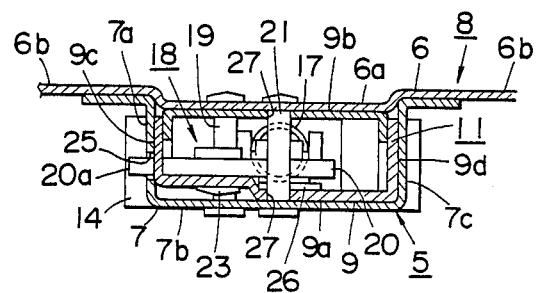
FIG. 4 is a horizontal sectional view taken across a line IV—IV of FIG. 3.

As shown in FIGS. 3 to 4, each rope hook arrangement 5 has a case 8 formed by a base plate 6 and a cover plate 7. The base plate 6 has a central portion 6a which is approximately vertical and approximately parallel to the longitudinal line of the truck, and front and rear portions 6b which project from the central portion 6a to the opposite directions, and extend upwardly. An upper end of each of the front and rear portions 6b of the base plate 6 is fixed to an underside of the top panel portion 3b of the side board 3. The cover plate 7 is fixed to an inwardly facing side of the base plate 6 by fastening means such as screws (not shown). The cover plate 7 has a central portion 7b approximately parallel to the central portion 6a of the base plate 6, and front and rear portions 7a and 7c which are both approximately perpendicular to the central portion 6a of the base plate 6. A cavity of an approximately rectangular parallelepiped is formed by the central portion 6a of the base plate 6, the central portion 7b of the cover plate 7 and the front and rear portions 7a and 7c of the cover plate 7.

A movable member 11 is slidable up and down in the cavity of the case 8. The movable member 11 has a rectangular tube portion 9 having an approximately rectangular section. The tube portion 9 is received in the cavity of the case 8 so that the tube portion 9 is slidable up and down in the cavity. The movable member 11 further has a rope hook 10 which is fixed to a top end of the tube portion 9. The rope hook 10 has a T-shaped section, as shown in FIG. 5.

The rope hook 10 has a neck portion 10a and a head portion 10b. The neck portion 10a has a bottom end fixed to the top end of the tube portion 9, and extends upwardly to the head portion 10b. The head portion 10b projects substantially horizontally from the top end of the neck portion 10a toward the front and the rear of the truck. The top panel portion 3b of the side board 3 is formed with a recess 12 for receiving the rope hook 10. The neck portion 10a of the rope hook 10 passes through an opening 13 formed centrally in a flat bottom 12a of the recess 12. The head portion 10b of the rope hook 10 is projected from the recess 12 and depressed in the recess 12 when the movable member 11 moves upwardly and downwardly in the case 8.

Figure 5:
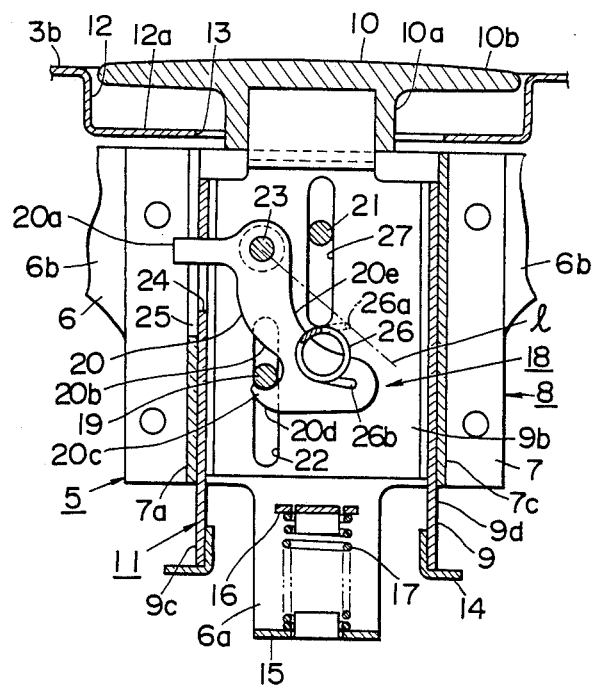
FIG. 5 is a vertical sectional view taken across a line V—V of FIG. 2, showing a state in which a movable member is in a middle position.

When the movable member 11 is in a middle position shown in FIG. 5, the top surface of the rope hook 10 is approximately even and smoothly continuous with the top surface of the top portion 3b of the side board 3. When the movable member 11 is in a depressed position shown in FIG. 6, the rope hook 10 is depressed in the recess 12 below the top surface of the top portion 3b of the side board 3, and the underside of the head portion 10b of the rope hook 10 abuts on the bottom 12a of the recess 12. When the movable member 11 is in a projected position shown in FIG. 7, the rope hook 10 is projected upwardly from the top surface of the top portion 3b of the side board 3. In the projected position, a stopper flange 14 fixed to the bottom end of the tube portion 9 of the movable member 11 abuts against the bottom end of the cover plate 7.

The central portion 6a of the base plate 6 extends downwardly and has a bottom end 15 which is bent perpendicularly toward the center line of the truck. The tube portion 9 of the movable member 11 has an inner wall 9a, which is formed with a bent portion 16. The bent portion 16 is formed by cutting and bending a portion of the inner wall 9a. The bent portion 16 projects integrally from the inner wall 9a of the tube portion 9 toward the base plate 6. A biasing means 17, such as a compression coil spring, is disposed under compression between the bottom end 15 of the base plate 6 and the bent portion 16 for always urging the movable member 11 upwardly to the projected position.

A latching means 18, such as a push-lock-push-release mechanism, is provided between the movable member 11 and the case 8. The mechanism 18 comprises a striker pin (first pin) 19, a latch lever 20 and a second pin 21.

The striker pin 19 is fixed to the case 8, in this embodiment. The striker pin 19 extends horizontally along a line perpendicular to the longitudinal line of the truck, and has an inner end fixed to the central portion 7b of the cover plate 7 and an outer end fixed to the central portion 6a of the base plate 6. The striker pin 19 passes through a pair of first holes 22 formed, respectively, in the inner and outer walls 9a and 9b of the tube portion 9 of the movable member 11 which walls are substantially parallel to each other and substantially parallel to the longitudinal line of the truck. The pair of holes 22 are located in a front lower quarter of the tube portion 9. That is, the holes 22 are located slightly ahead of a vertical bisector plane which divides the tube portion 9 into approximately equal front and rear halves, and in a lower part of the tube portion 9. The holes 22 are elongated vertically so that the striker pin 19 can move up and down in the holes 22 relative to the movable member 11.

The latch lever 20 in this embodiment is mounted on the movable member 11 in such manner that the latch lever 20 is swingable within the tube portion 9 about a pivot shaft 23 extending substantially at right angles to the longitudinal line of the truck. The pivot shaft 23 of the latch lever 20 is located in a front upper quarter of the tube portion 9. That is, the pivot shaft 23 is located in an upper part of the tube portion 9 and slightly ahead of the above mentioned vertical bisector plane. The latch lever 20 has a primary arm extending from a pivoted portion having the pivot shaft 23, approximately in a direction halfway between the rearward direction and the downward direction.

The latch lever 20 has a secondary arm 20a which extends integrally from the pivoted portion of the latch lever toward the front of the truck. The secondary arm 20a of the latch lever 20 passes through a vertically elongated hole 24 formed in a front wall 9c of the tube portion 9 and a U-shaped notch 25 which is cut in the front portion 7a of the cover plate 7 from the top edge and has a depth approximately equal to a half of the vertical length of the front portion 7a. Thus, the secondary arm 20a projects forwards from the case 8.

The latch lever 20 has a first guide surface 20b formed in a lower side of the primary arm. The first guide surface 20b extends smoothly from the pivoted portion of the latch lever 20, approximately in a direction halfway between the downward and rearward directions. The latch lever 20 further has a detent projection 20c projecting forwards from a lower end of the first guide surface 20b, and a third guide surface 20d extending smoothly from a tip end of the detent projection 20c toward a tip end of the primary arm of the latch lever 20 approximately in a direction halfway between the downward and rearward directions. Each of the first and third guide surfaces 20b and 20d is so designed that, whenever it intersects the vertically elongated holes 22, it intersects the holes 22 in such a direction that it slopes down toward the rear of the truck, as shown in FIG. 5.

The latch lever 20 further has a second guide surface 20e formed in an upper side of the primary arm. The second guide surface 20e slopes down smoothly toward the rear of the truck.

When the latch lever 20 is in a lock position shown in FIG. 5, and shown by a solid line in FIG. 7, the secondary arm 20a of the latch lever 20 abuts against the upper end of the vertically elongated hole 24, and the detent projection 20c intersects the vertically elongated holes 22, as shown in FIGS. 5, and 7, so that the striker pin 19 can engage with the detent projection 20c by being received in a notch formed on the upper side of the detent projection 20c. When the latch lever 20 is in a release position shown by a solid line in FIG. 6 and an imaginary line in FIG. 7, the rear and lower tip end of the primary arm of the latch lever 20 abuts against the rear wall 9d of the tube portion 9, and the detent projection 20c lies apart from the holes 22 rearwards. When the detent projection 20c engages with the striker pin 19 as shown in FIG. 5, the striker pin 19 prevents the movable member 11 from moving upwardly from the middle position to the projected position.

A spring 26, such as an over center spring of a coil shape, is disposed between the latch lever 20 and the movable member 11. A first end 26a of the spring 26 is connected to the inner wall 9a of the tube portion 9 of the movable member 11, and a second end 26b of the spring 26 is connected to the rear and lower tip end of the primary arm of the latch lever 20. When the latch lever 20 swings between the lock and release positions, the second end 26b of the spring 26 swings on both sides of a straight line l joining the first end 26a of the spring 26 and the axis of the pivot shaft 23 in FIG. 5. When the latch lever 20 is in an intermediate position between the lock and release positions, the second end 26b of the spring 26 lies on the line l. The spring 26 urges the latch lever 20 toward the lock position when the latch lever 20 is between the lock position and the intermediate position, and toward the release position when the latch lever 20 is between the intermediate position and the release position.

A second pin 21 is fixed to the case 8. The second pin 21 extends horizontally at right angles to the longitudinal line of the truck, and has an inner end fixed to the central portion 7b of the cover plate 7 and an outer end fixed to the central portion 6a of the base plate 6. The second pin 21 passes through a pair of second holes 27 formed, respectively, in the inner and outer walls 9a and 9b of the tube portion 9 of the movable member 11. The holes 27 are located in the upper part of the tube portion 9 in the middle between the front and rear walls 9c and 9d of the tube portion 9. The holes 27 are elongated vertically so that the second pin 21 can move up and down in the holes 27 relative to the movable member 11. When the movable member 11 moves from the middle position to the projected position, the second pin 21 abuts on the second guide surface 20e, and thereby forces the latch lever 20 to swing to the lock position.

As shown in FIG. 6, when the latch lever 20 is in the release position, the second guide surface 20e passes through the vertically elongated holes 27 in such a direction that the second guide surface 20e slopes down toward the rear of the truck.

The vertical lengths of the vertically elongated holes 22 and 27 are approximately equal to or greater than the distance from the depressed position to the projected position of the movable member 11.

The rope hook arrangement 5 is operated as follows:

When the movable member 11 is in the middle position as shown in FIGS. 2 to 5, the detent projection 20c of the latch lever 20 is engaged with the striker pin 19, so that the movable member 11 cannot move upwards from the middle position. The movable member 11 is held stably in the middle position because the spring 17 is urging the movable member 11 upwards. In this middle position, the upper surface of the rope hook 10 is even with the upper surface of the side board 3, so that the rope hook 10 is not obstructive, and the side board 3 is tidy in appearance.

If the movable member 11 is moved down from the middle position to the depressed position by pushing down the rope hook 10 by hand, and let free thereafter, then the movable member 11 moves upwards to the projected position spontaneously, and becomes ready for use for a rope 28 shown in FIG. 7.

During the downward movement of the movable member 11 from the middle position to the depressed position, the latch lever 20 moves down together with the movable member 11. At the same time, the striker pin 19 moves up relatively in the holes 22, abuts on the first guide surface 20b of the latch lever 20, and forces the latch lever 20 to swing to the release position.

When the latch lever 20 passes through the intermediate position toward the release position, the biasing direction to which the spring 26 urges the latch lever 20 is inverted, so that the spring 26 helps the latch lever 20 to swing to the release position.

When the underside of the head portion 10b of the rope hook 10 comes in contact with the bottom 12a of the recess 12, the movable member 11 assumes the depressed position shown in FIG. 6, and the latch lever 20 is held reliably in the release position.

When the movable member 11 is made free in the depressed position by unhanding the rope hook 10, the movable member 11 and the latch lever 20 are moved up together by the upward biasing force of the spring 17. During this upward movement of the movable member 11, the latch lever 20 is held reliably in the release position by the spring 26, so that the latch lever 20 cannot move toward the lock position. Therefore, the movable member 11 can pass upwardly through the middle position freely without being prevented by the striker pin 19.

When the movable member 11 reaches a position slightly higher than the middle position, the second pin 21 comes in contact with the second guide surface 20e of the latch lever 20 as shown in an imaginary line in FIG. 7. During the upward movement of the movable member 11 after that, the second pin 21 forces the latch lever 20 to swing toward the lock position by pushing the second guide surface 20e. When the latch lever 20 passes through the intermediate position, the biasing direction of the spring 26 is inverted again, so that the latch lever 20 is brought back to the lock position reliably. By this time, the movable member 11 has moved above the middle position, and the striker pin 19 has moved down sufficiently relative to the latch lever 20, so that the detent projection 20c cannot engage with the striker pin 19.

The movable member 11 moves up further with the latch lever 20 being held in the lock position until the movable member 11 reaches the projected position in which the stopper flange 14 abuts on the lower end of the cover plate 7, as shown in FIG. 7. In this projected position, the rope 28 can be easily passed around the neck portion 10a of the rope hook for tying loads of the truck.

After use, the rope hook 10 can be retracted simply by pushing down the rope hook 10 from the projected position to the middle position. During the downward movement of the movable member 11 from the projected position to the middle position, the latch lever 20 remains in the lock position and moves downwards together with the movable member 11. Immediately before the movable member 11 reaches the middle position, the striker pin 19 comes in contact with the third guide surface 20d, and causes the latch lever 20 to swing slightly toward the release position until the striker pin 19 passes over the detent projection 20c. In this case, the extent of the swing motion of the latch lever 20 is so small that the latch lever 20 does not reach the intermediate position. Therefore, after the striker pin 19 surmounts the detent projection 20c, the latch lever 20 is forced back to the lock position immediately by the biasing force of the spring 26, and the striker pin 19 enters the notch formed on the upper side of the detent projection 20c and thus engages with the detent projection 20c.

In this way, the rope hook of the present invention is projected and retracted repeatedly by simple operation. Besides, the push-lock-push-release mechanism of the present invention is very simple in construction. In the disclosed embodiment, the striker pin 19 combines the functions of a striker for preventing the upward movement of the movable member 11 from the middle position to the projected position, and of a pushing means for forcing the latch lever 20 from the lock position to the release position. Therefore, the arrangement of the disclosed embodiment is further simplified in construction.

The rope hook arrangement of the present invention can be installed in various manners. For example, the arrangement can be laid down so that the rope hook projects horizontally, or turned upside down. The arrangement can be disposed in the floor board or the tail board of a truck.

What is claimed is:

1. A rope hook arrangement for a vehicle, comprising housing means adapted to be fixed to a vehicle body,
a movable member mounted on the housing means, the movable member being movable relative to the housing means rectilinearly in outward and inward directions between a projected position and a depressed position, the movable member having a rope hook having an outwardly facing outward face, the rope hook being projected outwardly from a predetermined reference surface stationary relative to the housing means when the movable member is in the projected position, and depressed inwardly below the predetermined reference surface when the movable member is in the depressed position,
biasing means disposed between the housing means and the movable member for urging the movable member outwardly to the projected position, and
latching means for selectively allowing the movable member to move into the projected position and maintaining the movable member in a middle position lying between the projected and depressed positions, the outward face of the rope hook of the movable member lying on the reference surface when the movable member is in the middle position, the latching means comprising fixed means and swingable means one of which is mounted on the housing means and the other of which is mounted on the movable member, and fixed means being fixedly mounted, and the swingable means being mounted in such a manner that the swingable means is swingable between a lock position and a release position, the fixed means comprising first actuating means which engages with the swingable means and thereby prevents the movable member from moving outwardly from the middle position to the projected position when the movable member is in the middle position while at the same time the swingable means is in the lock position and which forces the swingable means to swing from the lock position toward the release position by pushing the swingable means when the movable member moves inwardly from the middle position to the depressed position, and second actuating means which forces the swingable means to swing from the release position toward the lock position when the movable member moves outwardly from the middle position to the projected position.

2. A rope hook arrangment according to claim 1, wherein the first actuating means consisting of a first pin.

3. A rope hook arrangement according to claim 2, wherein the fixed means is mounted on the housing means, and the swingable means is mounted on the movable member.

4. A rope hook arrangement according to claim 3, wherein the latching means further comprises holding means mounted on the movable member for urging the swingable means to the lock position when the swingable means lies between the lock position and a predetermined intermediate position between the lock and release positions, and urging the swingable means to the release positon when the swingable means lies between the intermediate position and the release position.

5. A rope hook arrangement according to claim 4, wherein the the second actuating means consists of a second pin fixed to the housing means, and wherein the swingable means comprises a latch lever swingable between the first and second pins in a plane which is parallel to a straight line along which the movable member is movable.

6. A rope hook arrangement according to claim 5, wherein the latch lever has a detent projection so shaped that the detent projection can engage with the first pin and thereby prevent the movable member from moving outwardly when the swingable means is in the lock position while at the same time the movable member is in the middle position, a first guide surface so shaped that the first pin can slide on the first guide surface and thereby force the swingable means to swing toward the release position when the movable member moves inwardly from the middle position to the depressed position, and a second guide surface so shaped that the second pin can slide on the second guide surface and thereby force the swingable means to swing toward the lock position when the movable member moves outwardly from the middle position to the projected position.

7. A rope hook arrangement according to claim 6, wherein the latch lever further has a third guide surface so formed on one side of the detent projection that, when the movable member moves inwardly from the projected position to the middle position, the first pin slides on the third guide surface and thereby surmounts the detent projection to come into engagement with the detent projection by forcing the swingable means to swing from the lock position toward the intermediate position to such a small extent that the intermediate position cannot be reached.

8. A rope hook arrangement according to claim 7, wherein the housing means has a case having an approximately rectangular section, and the movable member has a tube portion having an approximately rectangular section, the tube portion being slidably received in the case of the housing means, the swingable means being disposed within the tube portion, the tube portion having a pair of first holes which are formed on opposite sides of the tube portion and elongated along the line of the rectilinear motion of the movable member and pair of second holes which are formed on the opposite sides of the tube portion and elongated along the line of the rectilinear motion of the movable member, each of the first and second pins extending in parallel to an axis about which the swingable means swings, the first pin passing through the first holes, the second pin passing through the second holes.

* * * * *

UNITED STATES PATENT AND TRADEMARK OFFICE
CERTIFICATE OF CORRECTION

PATENT NO. : 4,820,094

DATED : April 11, 1989

INVENTOR(S) : Hirakui, Hidemasa; Yokohama; and Kishima, Masayoshi; Atsugi, Japan It is certified that error appears in the above-identified patent and that said Letters Patent is hereby corrected as shown below:

On The Title Page, Item [73], should read

[73] Assignee: Nissan Motor Co., Ltd., Japan and
Ohi Seisakusho Co., Ltd., Japan Signed and Sealed this Twenty-third Day of January, 1990

Attest:

JEFFREY M. SAMUELS

Attesting Officer     Acting Commissioner of Patents and Trademarks